United States Patent
Kuhlman et al.

(10) Patent No.: US 6,913,778 B2
(45) Date of Patent: Jul. 5, 2005

(54) INFANT FORMULA COMPOSITIONS COMPRISING INCREASED AMOUNTS OF ALPHA-LACTALBUMIN

(75) Inventors: Charles F. Kuhlman, Media, PA (US); Eric Lien, Malvern, PA (US); John Weaber, Wayne, PA (US); Daniel O'Callaghan, Limerick (IE)

(73) Assignee: Wyeth, Madison, NJ (US)

( * ) Notice: Subject to any disclaimer, the term of this patent is extended or adjusted under 35 U.S.C. 154(b) by 227 days.

(21) Appl. No.: 10/318,977

(22) Filed: Dec. 13, 2002

(65) Prior Publication Data

US 2003/0124237 A1 Jul. 3, 2003

Related U.S. Application Data

(60) Provisional application No. 60/343,253, filed on Dec. 21, 2001.

(51) Int. Cl.⁷ .................................................. A23L 9/15
(52) U.S. Cl. ...................... 426/583; 426/585; 426/656; 426/801
(58) Field of Search ................................ 426/583, 585, 426/801, 656

(56) References Cited

U.S. PATENT DOCUMENTS

| 4,485,040 A | 11/1984 | Roger et al. |
| 5,169,666 A | 12/1992 | Woychik |
| 5,420,249 A | 5/1995 | De Wit et al. |
| 5,436,020 A | 7/1995 | Kuwata et al. |
| 5,455,331 A | 10/1995 | Pearce |
| 5,503,864 A | 4/1996 | Uchida et al. |
| 6,312,755 B1 | 11/2001 | Wu |

FOREIGN PATENT DOCUMENTS

| CA | 1 243 887 A | 1/1988 |
| EP | 0 311 283 A2 | 4/1989 |
| EP | 0 604 684 A | 6/1994 |
| WO | WO 02 28194 A1 | 4/2002 |

OTHER PUBLICATIONS de Wit, J.N., Journal of Dairy Science 81:597–608 (1998).
Jarvenpaa, A. L., N.C. Raiha, et al., Pediatrics 70(2): 214–20 (1982).
Rudloff, S., and . Kunz, J Pediatri Gastroenterol Nutr. 24(3): 328–44 (1997).
J. Timmer: "Whey protein concentrates with non–traditional compositions", European Dairy Magazine, vol. 189, No. 8, 1997, pp. 47–49, XP008016321 p. 48– p. 49; figure 2.

*Primary Examiner*—Helen Pratt
(74) *Attorney, Agent, or Firm*—Joseph M. Mazzarese

(57) ABSTRACT

An infant formula composition is provided comprising a whey fraction wherein 40% or less of the total protein in said fraction is alpha-lactalbumin and more than 8% of the total protein in said whey fraction is beta-lactoglobulin, with the proviso that the percentage of alpha-lactalbumin in said whey fraction is greater than the percentage of beta-lactoglobulin in said whey fraction.

9 Claims, No Drawings

INFANT FORMULA COMPOSITIONS COMPRISING INCREASED AMOUNTS OF ALPHA-LACTALBUMIN

This application claims priority from copending provisional application Ser. No. 60/343,253, filed on Dec. 21, 2001, the entire disclosure of which is hereby incorporated by reference.

FIELD OF THE INVENTION

This invention is directed to infant formula compositions which demonstrate improved tolerance by infants. Specifically, the present invention is directed to infant formula compositions comprising a modified whey protein concentrate comprising specific amounts of alpha-lactalbumin and beta-lactoglobulin.

DESCRIPTION OF THE PRIOR ART

Human milk is the preferred means for feeding the newborn human infant for the first four to six months of life. Infant formulas have been developed to replace or to supplement human milk when breast-feeding is inadequate, unsuccessful, or when a mother chooses not to breast feed. Attempts of improving infant formula composition have focused on more closely simulating the composition of breast milk.

Bovine milk has been used in infant formulas for over eighty years. However, the protein systems of human milk and cow's milk differ substantially, both quantitatively and qualitatively. Prominent quantitative differences include a lower total protein content of human milk (11 g/L) compared to cow's milk (33 g/L) and a difference in the ratio of whey proteins to caseins, which is 18:82 in bovine milk and 60:40 in human milk.

Attention in this area has focused on the notable qualitative differences between bovine milk and human milk, in their amounts of individual whey proteins, specifically alpha-lactalbumin and beta-lactoglobulin. Alpha-lactalbumin, a protein found in the milk of all mammals, is a major protein in human milk. Beta-lactoglobulin is absent from human milk. The protein content of bovine whey contains about 50% to 55% of beta-lactoglobulin and about 18% of alpha-lactalbumin. The ratio of beta-lactoglobulin to alpha-lactalbumin in bovine whey ranges between 2.5:1 and 4:1. Furthermore, it is known that the elimination or removal of beta-lactoglobulin in bovine milk increases the total amount of alpha-lactalbumin from 18% to 40% of bovine whey proteins, de Wit, J. N., "Nutritional and Functional Characteristics of Whey Proteins in Food Products", *Journal of Dairy Science* 81: 597–608 (1998).

Beta-lactoglobulin is particularly rich in the essential amino acids valine and threonine. Alpha-Lactalbumin is particularly rich in the essential amino acids tryptophan, lysine and cystine compared to other bovine milk proteins, Jarvenpaa, A. L., N. C. Raiha, et al., "Milk protein quantity and quality in the term infant. I. Metabolic responses and effects on growth", *Pediatrics* 70(2): 214–20 (1982). As a consequence of the differing amounts of the specific whey proteins in bovine milk and human milk and the amino acid compositions of these proteins, bovine milk and human milk differ substantially in their amino acid profiles, Rudloff, S. and C. Kunz, "Protein and nonprotein nitrogen components in human milk, bovine milk, and infant formula: quantitative and qualitative aspects in infant nutrition", *J Pediatr Gastroenterol Nutr* 24(3): 328–44 (1997). This difference remains in infant formulas made with bovine whey in which the composition of the specific whey protein is not modified.

As noted above, the elimination or reduction of beta-lactoglobulin in cow's milk-based infant formula increases the content of alpha-lactalbumin. Such a change would subsequently increase the levels of the essential amino acids cystine, tryptophan, tyrosine and phenylalanine and reduce the level of the essential amino acid threonine to levels that more closely resemble those in human milk. Therefore, an improved amino acid composition would permit a reduction in the total protein content of an infant formula.

DeWit, de Wit, J. N., "Nutritional and Functional Characteristics of Whey Proteins in Food Products", *Journal of Dairy Science* 81: 597–608 (1998), describe research activities focused on the fine-tuning of both milk protein and amino acid composition and specifically on enriching bovine milk with alpha-lactalbumin, beta-casein and lactoferrin to achieve the optimal nutritional composition, particularly with respect to the amino acid composition thereof. A nutritional composition is proposed which comprises beta-lactoglobulin-depleted whey proteins, beta-casein and lactoferrin in desalted bovine milk permeate. It is postulated that such a preparation will have a protein composition more closely approaching that of human milk than existing infant formulas.

Dairy technology has focused on whey protein fractionation processes to selectively remove substantially all the beta-lactoglobulin from whey or to isolate enriched alpha-lactalbumin fractions substantially free of beta-lactoglobulin, for use in foods, including infant formula. U.S. Pat. No. 5,455,331 describes a process using undefatted ultrafiltered whey to produce a material with a high alpha-lactalbumin content and, on a total precipitable protein basis, less than 5% of beta-lactoglobulin. The process involves heat precipitation of alpha-lactalbumin in undefatted ultrafiltered cheese whey at a pH of 4.2. The alpha-lactalbumin-rich precipitate is clarified, washed, neutralized, ultrafiltered and spray dried to yield a whey fraction, the protein therein being predominantly alpha-lactalbumin, substantially depleted of beta-lactoglobulin and including the lipid-containing components in the whey. U.S. Pat. No. 5,420,249 discloses the use of defatted whey and calcium-binding resin to prepare whey for separation and a preferred alpha-lactalbumin fraction comprising at least 60% of the protein as alpha-lactalbumin and at most 10% of the protein as beta-lactoglobulin. They describe an alpha-lactalbumin-enriched fraction containing 13% of the protein as beta-lactoglobulin. However, this fraction contained 74% of the protein as alpha-lactalbumin, with a beta-lactoglobulin to alpha-lactalbumin ratio of 1:6. Other alpha-lactalbumin-enriched fractions had beta-lactoglobulin to alpha-lactalbumin ratios of 1:4 to 1:7.

U.S. Pat. No. 5,436,020 describes an infant formula devoid of untreated cows' milk protein which is made with a material consisting of delactosed and deionized whey permeate as a source of non-protein nitrogen combined with a fractionated whey ultrafiltered to remove casein glycomacropeptides and fat. U.S. Pat. No. 5,169,666 describes treating bovine milk to eliminate or substantially reduce the alpha-s-casein and to reduce the beta-lactoglobulin level to 4% or less as a percentage of the protein, in order to make a 'humanized' bovine milk material for infant feeding.

SUMMARY OF THE INVENTION

The present invention is directed to an infant formula composition which is well-tolerated by infants. The infant formula composition of the present invention comprises a whey fraction wherein 40% or less of the total protein in the whey fraction is alpha-lactalbumin and more than 8% of the total protein in the whey fraction is beta-lactoglobulin, with the proviso that the percentage of alpha-lactalbumin is greater than the percentage of beta-lactoglobulin in the whey fraction.

DETAILED DESCRIPTION OF THE INVENTION

The present invention is further directed to a nutritionally complete infant formula comprising bovine milk in a quantity sufficient to provide about 1.0 to about 1.2 grams of protein per 100 available kilocalories and an amount of bovine whey material sufficient to provide about 1.0 to about 1.2 grams of protein per 100 available kilocalories, the bovine whey material having an alpha-lactalbumin content of between about 28% to about 40% and a beta-lactoglobulin content of between about 8% to about 33% of total protein. Preferably, the whey material has an alpha-lactalbumin content between about 28% to about 36% and a beta-lactoglobulin content of between about 10% to about 29% of total protein. In the present formulas, the percentage of alpha-lactalbumin in the whey fraction is greater than the percentage of beta-lactoglobulin in the whey fraction. Preferably the beta-lactoglobulin content in the whey fraction is not greater than the percentage of the alpha-lactalbumin in the whey fraction minus 7%.

Preferably, the modified whey with specific amounts of alpha-lactabumin and beta-lactoglobulin composition of the present invention has a non-protein nitrogen content of about 15% or less of total nitrogen; a total protein content of between about 12.5 to about 95%; a fat content of about 15% or less; and an ash content of about 4.5% or less, all percentages on a w/w basis. Preferably, the total protein content of the modified whey is between about 35% to about 80% and more preferably about 73% to about 77%.

The bovine whey material utilized in the composition of the present invention has a minimum amino acid content, in grams per 100 grams of total protein, as follows: arginine 3.1; cystine 1.4; histidine 1.6; isoleucine 1.0; leucine 5.3; lysine 3.9; methionine 0.3; phenylalanine 1.2; threonine 3.2; tryptophan 1.5; tyrosine 0.9; and valine 1.0. Accordingly, it is not necessary that the infant formula of the present invention contain added amino acids.

The present infant formula may be additionally formulated with other nutritionally beneficial ingredients known in the art, e.g., oils providing longer chain polyunsaturated fatty acids, such as arachidonic acid and docosahexaenoic acid. The present infant formula may further be formulated with vitamins, minerals, selenium, natural carotenoids, nucleotides, taurine and other nutrients.

Thus, in one embodiment, the present invention is directed to a nutritionally complete infant formula composition containing 2.0–2.4 grams of protein per 100 available kilocalories, wherein the protein is comprised of substantially equal amounts of protein from unmodified bovine milk and from a whey fraction, said whey fraction being enriched with respect to alpha-lactalbumin.

The present infant formula may be prepared by blending appropriate quantities of an alpha-lactalbumin-enriched whey protein concentrate with skimmed milk, lactose, vegetable oils and fat soluble vitamins in deionized water. Preferably, these materials are blended together in quantities sufficient to provide a final concentration of approximately 240 grams/liter. Mineral salts may then be added to the mixture prior to a high temperature/short time pasteurization step. Appropriate mineral salts include calcium chloride, calcium carbonate, sodium citrate, potassium hydroxide, potassium bicarbonate, magnesium chloride, ferrous sulfate, potassium citrate, zinc sulfate, calcium hydroxide, copper sulfate, magnesium sulfate, potassium iodide, sodium selenite, etc. The mixture is then homogenized and cooled. Heat-labile vitamins and micronutrients may then be added to the mixture. The mixture is then standardized with deionized water to a final total solids concentration of about 120 to about 135 and preferably about 123 grams per litre, which is equivalent to about 670 kcal per litre. The formula may be sterilized using a conventional ultra-high temperature or standard retort process. This sterilized material is then placed in appropriate packaging.

It would be obvious to one skilled in the art that other known methods of manufacture and sterilization can be used for the preparation of the present infant formula. The present infant formula may also be produced as a concentrated liquid product requiring dilution with an equal volume of water prior to feeding to an infant. Furthermore such an infant formula may be dehydrated, such as in a spray dryer, to create a stable infant formula powder that offers advantages of stability and economy of transport, said powder requiring reconstitution with water prior to feeding to an infant.

The infant formula of the present invention is advantageous in that it has an amino acid profile composition that does not require addition of added essential amino acids to meet or exceed European Union [Directive 91/321/EEC] standards for amino acids in infant formula. Said amino acid profile permits a reduction in total protein concentration to 2.1 grams per 100 available kilocalories, which is closer to the total protein concentration in human milk. Another advantage is an infant formula that exceeds the protein requirements of the U.S. Infant Formula Act. A further advantage is an infant formula that contains the average amount of alpha-lactalbumin as found in human milk. Yet a further advantage is an infant formula that contains alpha-lactalbumin as the major whey protein. Yet another advantage is an infant formula that contains long chain omega-3 and omega-6 polyunsaturated fatty acids at nutritionally desirable levels.

Bovine milk is the basis for most infant formulas. Despite a total protein concentration three times as high as that of human milk, bovine milk contains less than half as much alpha-lactalbumin as human milk. Human milk does not contain any beta-lactoglobulin. In contrast, beta-lactoglobulin is the most abundant whey protein in bovine milk (Table 1).

Most current infant formulas made with unmodified bovine milk as the only protein source contain about 15–16 g/L of protein, are casein-predominant and contain only 0.5 g/L of alpha-lactalbumin (Table 1). Current infant formulas made with whey protein unmodified with respect to protein composition contain 15 g/L of protein. Demineralized whey supplies half of the protein in these infant formulas. These infant formulas contain 1.2 g/L of alpha-lactalbumin, approximately half as much as in an equal volume of human milk (Table 1).

TABLE 1

| Protein, g/L (N * 6.38) | Human milk | Bovine milk | Standard Milk-based Infant Formula | Standard Current whey based Infant Formula |
|---|---|---|---|---|
| Total 'protein' | 11 | 33–35 | 15–16 | 15 |
| Whey protein | 6.0 | 6.3–7.0 | 2.9–3.2 | 9.0 |

TABLE 1-continued

| Protein, g/L (N * 6.38) | Human milk | Bovine milk | Standard Milk-based Infant Formula | Standard Current whey based Infant Formula |
|---|---|---|---|---|
| alpha-lactalbumin | 2.3 | 1.1 | 0.5 | 1.2 |
| beta-lactoglobulin | none | 3.1 | 1.4–1.6 | 4.2 |

EXAMPLE 1

A whey protein concentrate enriched with respect to alpha-lactalbumin but containing a significant level of beta-lactoglobulin was prepared for use in the present infant formulas. The concentrate had the following proximate and mineral composition and whey protein proportions.

TABLE 2

| Analyte | unit | |
|---|---|---|
| Fat | % | 14.1 |
| Moisture | % | 4.2 |
| Protein | % | 73.7 |
| Ash | % | 3.44 |
| α-lactalbumin | %* | 31.6 |
| β-lactoglobulin | %* | 16.1 |
| α/β | | 1.96 |
| Phosphorus | mg % | 372 |
| Magnesium | mg % | 5.90 |
| Calcium | mg % | 40.5 |
| Sodium | mg % | 138 |
| Potassium | g % | 1.7 |
| Chloride | mg % | 352 |

*grams per 100 grams of protein.

The proportions of alpha-lactalbumin and beta-lactoglobulin in the whey protein fraction was measured after 2-Mercaptoethanol reduction using a GPC (gel permeation chromatography) method with 6M Guanidine HCL as the mobile phase and the solvent.

The chromatography column was packed with Progel TSK G3000 SW XL. Two columns were arranged in series with a guard column of SW XL. The mobile phase was prepared by dissolving 573.18 g Guanidine HCl in 600 mL of HPLC grade water. Buffer stock, 100 mL, was added and the solution was heated and stirred to achieve complete dissolution. The pH was adjusted to pH 7.5 with 50% sodium hydroxide. After filtering, the solution was diluted to 1 liter. The buffer stock was prepared by dissolving 56.6g Na2HPO4, 3.5 g NaH2PO4 and 2.9 g ethylene diamine tetraacetic acid in 1000 mL of HPLC grade water and adjusting to pH 7.5 with hydrochloric acid.

The chromatography conditions included the following: Flow Rate, 0.5 mL/min; Run Time, 60 min; Injection Volume, 50 microliters; Temperature, Ambient; and Detector, UV 280 nm.

Samples were prepared by weighing an amount equivalent to 10 mg of protein into a 10 mL volumetric flask. The mobile phase was added to volume and the flask was mixed well. The solution was sonicated for 20 minutes. About one milliliter of the solution is transferred to an injection vial, 10 microliters of 2-Mercaptoethanol are added and the solution is mixed on a vortex mixer for 10 seconds. The sample was then injected into the HPLC system.

Standards were prepared by weighing about 25 mg of bovine alpha-Lactalbumin and beta-Lactoglobulin separately, and dissolving them with HPLC grade water in a 10 mL volumetric flask. Calibration standard were prepared by pipetting 1.0 mL of each standard into a 10 mL volumetric flask and diluting to volume with the mobile phase. About-one milliliter of each calibration standard solution was transferred to an injection vial, 10 microliters of 2-Mercaptoethanol were added and the solution was mixed with a vortex mixer for 10 seconds. The standard sample was then injected into the HPLC system.

EXAMPLE 2

The whey protein concentrate of Example 1 was mixed with an amount of skim milk containing an equal amount of protein to provide a ratio of whey proteins to caseins of 60:40. Alpha-lactalbumin was found to be the dominant whey protein in this protein mixture.

This protein mixture was used to prepare an improved infant formula with a protein content lower than that in standard whey-based infant formula and closer to that found in human milk. The protein content, whey protein content, alpha-lactalbumin level and beta-lactoglobulin level of said infant formula are shown in Table 3. The amount of alpha-lactalbumin in said infant formula was greater than the amount of beta-lactoglobulin. The amount of alpha-lactalbumin in said infant formula was essentially equal to the amount of alpha-lactalbumin in human milk.

TABLE 3

| Protein, g/L (N * 6.38) | Human milk | Milk-based Infant Formula | Standard Current whey based Infant Formulas | Standard Infant Formula of the Invention |
|---|---|---|---|---|
| Total 'protein' | 11 | 15–16 | 15 | 14 |
| Whey protein | 6.0 | 2.9–3.2 | 9.0 | 8.4 |
| alpha-lactalbumin | 2.3 | 0.5 | 1.2 | 2.2–2.5 |
| beta-lactoglobulin | none | 1.4–1.6 | 4.2 | 1.3–2.1 |

Four batches of ready-to-feed liquid infant formulas incorporating this protein mixture were manufactured in 4000-liter quantities in the following manner.

A fat blend for each batch was prepared by combining 43.54 kg of randomized palm olein, 35.2 L of a high-oleic sunflower oil or safflower oil, 34.6 L of coconut oil, 28.1 L of soybean oil, 1.36 kg of soy lecithin, 1.37 kg of distilled monoglycerides, 1.19 kg of an oil containing 38% of its fatty acids as arachidonic acid (ARASCO, Martek, Columbia, Md.) and 0.74 kg of an oil containing 38% of its fatty acids as docosahexaenoic acid (DHASCO, Martek, Columbia, Md.).

The fat-soluble vitamins vitamin A (vitamin A palmitate and natural mixed carotenoids), vitamin D (cholecalciferol), vitamin E (dl-alpha-tocopherol acetate) and vitamin K (phytonadione) were then dispersed in the fat blend.

To produce a batch of the improved formula, an amount of heated liquid skim milk or powdered skim milk sufficient to provide 28 kg of protein was added to warm deionized water in a compounding tank to which had been added 723 g of sodium citrate and 404 g potassium bicarbonate dissolved in hot water. The fat blend was metered into the compounding tank. The major dry ingredients, lactose and the whey protein concentrate were added through a powder funnel eductor. The amount of added whey protein concentrate varied according to its protein content and was sufficient to provide 28 kg of protein. Taurine, 221 g was dissolved in hot water and added to the compounding tank.

The following minerals were dissolved or dispersed separately in hot water and added to the compounding tank with intensive agitation: calcium carbonate, 679 g; calcium hydroxide, 262 g; potassium hydroxide, 143 g; magnesium chloride, 507 g; calcium chloride, 292 g; potassium chloride, 552 g; ferrous sulfate, 151 g; potassium iodide, 31.6 g of a 1% triturate in lactose; 250 g of a 44.6% solution of zinc sulfate; 367 g of a 2.5% solution of copper sulfate; 5.08 g of a 2.5% solution of manganese sulfate, and 12.5 g of a 0.3% sodium selenite triturate in potassium bicarbonate.

The mixture was heated to 96±2° C., held for 30 seconds and then cooled to 66±2° C. The mixture was then homogenized in a two-stage homogenizer, at 2500 psig in the first stage and 500 psig in the second stage. The homogenized mixture was then cooled to 5–10° C. using a plate heat exchanger.

A sample of the mixture was analyzed for fat, pH and total solids. An appropriate amount of deionized water was added as required to achieve 80% of total dilution and the batch was mixed. A sample was taken for analysis of total solids and pH. The quantity of water required for final dilution was calculated. A portion of this dilution water was used to dilute the nucleotides and water-soluble vitamins before their addition to the mix. The following nucleotides were dissolved in warm water and added to the mix: cytidine 5' monophosphate, 63.7 g; adenosine 5' monophosphate, 18.6 g; uridine 5' monophosphate, disodium salt, 32.4 g; inosine 5' monophosphate, disodium salt, 13.0 g; and guanosine 5' monophosphate, disodium salt, 11.2 g.

An appropriately formulated water-soluble vitamin premix was dissolved in warm water and this solution was added to the mix. Choline chloride, 251 g, and myo-inositol, 104 g, were dissolved in water and added to the mix. Ascorbic acid, 812 g, was dissolved in warm water and 462 g of potassium bicarbonate were added slowly to neutralize the ascorbic acid. The neutral ascorbate solution was then added to the mix. The mix was agitated for 30 minutes. The mix was standardized to total solids of about 123 g per litre.

Twenty hours after the initial homogenization, the mix was homogenized again and sterilized through a Stork UHT (ultra high temperature) aseptic processing system and aseptically filled into 250-mL flexible containers.

Control Formula

Control batches of ready-to-feed liquid infant formulas made with demineralized whey (typically 13.5% protein, 85% lactose, fat 1%, and an ash content of less than 1.5%) were manufactured in 4000-liter quantities in the following manner. An amount of heated liquid skim milk sufficient to provide 30 kg of protein was added to warm deionized water in a compounding tank to which had been added sodium citrate and potassium citrate dissolved in hot water. The fat-soluble vitamin-enriched fat blend was metered into the compounding tank. The major dry ingredients, lactose and the demineralized whey, were added through a powder funnel eductor. The amount of added demineralized whey varied according to its protein content and was sufficient to provide 30 kg of protein. Taurine was dissolved in hot water and added to the compounding tank. The following minerals were dissolved or dispersed separately in hot water, and combined and added to the compounding tank with intensive agitation: potassium bicarbonate, calcium chloride, potassium chloride, sodium chloride, calcium citrate, ferrous sulfate, potassium iodide, zinc sulfate, copper sulfate, manganese sulfate, and sodium selenite.

The control formula was heat treated, homogenized and supplemented with nucleotides and a water-soluble vitamin premix in the same manner as the formula of the present invention described above. The control formula mix was homogenized again and sterilized through a Stork UHT (ultra high temperature) aseptic processing system and filled into 250-mL flexible containers.

The major ingredients of the two formulas of this example are as follows:

TABLE 4

| Control Formula | Formula of the Present Invention |
| --- | --- |
| Electrodialyzed whey | Alpha-Lactalbumin enriched whey fraction |
| Vegetable oils (palm, soybean, coconut and high oleic sunflower or safflower) | Vegetable oils (palm, soybean, coconut and high oleic sunflower or safflower) |
| Skim milk | Skim milk |
| Lactose | Lactose |
| Emulsifiers (soy lecithin, monoglycerides) | Emulsifiers (soy lecithin, monoglycerides) |
| Long chain polyunsaturated oils | Long chain polyunsaturated oils |
| Taurine | Taurine |
| Cytidine-5'-monophosphate | Cytidine-5'-monophosphate |
| Disodium uridine-5'-monophosphate | Disodium uridine-5'-monophosphate |
| dl-Alpha-tocopherol acetate | dl-Alpha-tocopherol acetate |
| Adenosine-5'-monophosphate | Adenosine-5'-monophosphate |
| Disodium inosine-5'-monophosphate | Disodium inosine-5'-monophosphate |
| Disodium guanosine-5'-monophosphate | Disodium guanosine-5'-monophosphate |

The mineral ingredients in the two formulas were as follows:

TABLE 5

| Control Formula | Formula of the Present Invention |
| --- | --- |
| Calcium chloride | Sodium citrate |
| Potassium bicarbonate | Calcium carbonate |
| Sodium chloride | Potassium Hydroxide |
| Potassium hydroxide | Magnesium chloride |
| Ferrous sulfate | Calcium chloride |
| Potassium citrate | Potassium chloride |
| Zinc sulfate | Calcium hydroxide |
| Calcium citrate | Ferrous sulfate |
| Copper sulfate | Zinc sulfate |
| Potassium chloride | Potassium iodide |
| Manganese sulfate | Copper sulfate |
| Potassium iodide | Manganese sulfate |
| Sodium selenite | Sodium selenite |

The vitamin ingredients in the two formulas were as follows:

TABLE 6

| Control Formula | Formula of the Present Invention |
| --- | --- |
| Vitamin C (ascorbic acid) | Vitamin C (ascorbic acid) |
| Vitamin E (dl-Alpha tocopherol acetate) | Choline chloride |
| Ascorbyl palmitate | Inositol |
| Niacin (nicotinamide) | Vitamin E (dl-Alpha tocopherol acetate) |
| Pantothenic acid | Niacin (nicotinamide) |
| Vitamin A palmitate | Ascorbyl palmitate |
| Thiamine hydrochloride | Pantothenic acid |
| Vitamin B-6 | Vitamin A palmitate |
| Riboflavin | Riboflavin |
| beta-carotene | Thiamine hydrochloride |
| Folic acid | Vitamin B-6 |
| Vitamin K (phytonadione) | Natural mixed carotenoids |
| Biotin | Folic acid |
| Vitamin D (cholecalciferol) | Vitamin K (phytonadione) |

TABLE 6-continued

| Control Formula | Formula of the Present Invention |
|---|---|
| Vitamin B-12 | Biotin |
| | Vitamin D (cholecalciferol) |
| | Vitamin B-12 |

The nutrient compositions of the present infant formula and the Control Formula are set forth in Table 7.

TABLE 7

| Nutrient (units/L) | Formula of the Present Invention | Control Formula |
|---|---|---|
| Energy (kcal) | 672 | 672 |
| Protein (g) | 14 | 15 |
| Carbohydrate (g) | 73 | 72 |
| Fat (g) | 36 | 36 |
| Vitamin A (IU) | 2200 | 2200 |
| Beta-carotene (IU) | 400 | 400 |
| Vitamin D (IU) | 425 | 425 |
| Vitamin E (IU) | 11 | 11 |
| Vitamin K ($\mu$g) | 67 | 67 |
| Vitamin $B_1$ ($\mu$g) | 1000 | 1000 |
| Vitamin $B_2$ ($\mu$g) | 1500 | 1500 |
| Vitamin $B_6$ ($\mu$g) | 600 | 600 |
| Vitamin $B_{12}$ ($\mu$g) | 2 | 2 |
| Niacin ($\mu$g) | 5000 | 5000 |
| Folic Acid ($\mu$g) | 80 | 80 |
| Pantothenic Acid ($\mu$g) | 3000 | 3000 |
| Biotin ($\mu$g) | 20 | 20 |
| Vitamin C (mg) | 90 | 90 |
| Choline (mg) | 100 | 100 |
| Inositol (mg) | 45 | 45 |
| Taurine (mg) | 47 | 47 |
| Calcium (mg) | 420 | 460 |
| Phosphorus (mg) | 240 | 333 |
| Magnesium (mg) | 45 | 64 |
| Iron (mg) | 8 | 8 |
| Zinc (mg) | 6 | 6 |
| Manganese ($\mu$g) | 50 | 50 |
| Copper ($\mu$g) | 560 | 333 |
| Iodine ($\mu$g) | 100 | 100 |
| Sodium (mg) | 160 | 160 |
| Potassium (mg) | 650 | 700 |
| Chloride (mg) | 433 | 433 |
| Selenium ($\mu$g) | 14 | 14 |
| Nucleotides | | |
| CMP (mg) | 16.5 | 16.5 |
| UMP (mg) | 5.0 | 5.0 |
| AMP (mg) | 4.0 | 4.0 |
| GMP (mg) | 2.0 | 2.0 |
| IMP (mg) | 2.0 | 2.0 |

The calcium and phosphorus levels in the present formula are closer than standard formulas to the levels found in human milk. Human milk contains an average of 254 mg/L of calcium and 139 mg/L of phosphorus.

EXAMPLE 3

Four individual batches of the infant formula according to the present invention were produced. Each batch was analyzed for amino acid composition by standard high performance liquid chromatography methods. The average levels of amino acids essential for the human infant in the protein in the improved formula are shown in Table 8. The present formula has an amino acid profile closer to that of human milk than standard whey formulas (Table 8). The protein source of the present formula is higher in tryptophan, lysine and cystine and is lower in threonine than standard whey-based formulas.

The European Union (EU) has provided a specific human milk amino composition to which formulas must be compared [Directive 91/321/EEC]. EU requires amino acid composition must be 100% of EU human milk values on a volume basis in mg/100 kcal. The factor used to convert mg/100 kcal to mg/L was 676 kcal/L.

TABLE 8

Essential amino acid composition on a mg/L basis for improved formula, human milk per European Union Annex V, and current whey-based formula.

| Amino acid | European Union Annex V Human Milk | Infant Formula of the Present Invention | Standard whey based Infant Formula |
|---|---|---|---|
| Arginine | 466 | 490 | 560 |
| Cystine | 162 | 250 | 230 |
| Histidine | 304 | 360 | 380 |
| Isoleucine | 487 | 750 | 870 |
| Leucine | 1055 | 1340 | 1410 |
| Lysine | 825 | 1140 | 1130 |
| Methionine | 196 | 290 | 360 |
| Phenylalanine | 419 | 610 | 620 |
| Threonine | 541 | 710 | 810 |
| Tryptophan | 203 | 290 | 230 |
| Tyrosine | 399 | 590 | 540 |
| Valine | 541 | 840 | 870 |

The formula of the present invention contains a higher level of tryptophan, an essential aromatic amino acid, than does human milk or current whey-based infant formula. Infants fed current infant formula often have plasma amino acid levels that exceed the levels found in breast-fed infants with the exception of tryptophan. Plasma tryptophan levels of formula-fed infants often are significantly lower than those of breast-fed infants, Fazzolari-Nesci et al, "Tryptophan Fortification of Adapted Formula Increasing Plasma Tryptophan Concentrations to Levels Not Different from Those Found in Breast-Fed Infants," *Journal of Ped. Gastro and Nut.*, 14:456–459 (1992). Tryptophan is the precursor to the neurotransmitter serotonin, Fernstrom et al, "Brain Serotonin Content: Physiological Regulation by Plasma Neutral Amino Acids," *Science*, 178: 414–415 (1972). Elevated serotonin levels are associated with improved sleep latency (quicker onset of sleep). Tryptophan supplementation of infants shortens the time to onset of sleep, Yogman et al, "Dietal Sleep Patterns In Newborn Infants," *New England Journal of Medicine*, 309(19): 1147–9 (1983).

Tryptophan competes for the same transport system as large neutral amino acids (LNAA). Thus, if relatively high concentrations of LNAA are present, tryptophan is less efficiently transported across cells. In order to ensure optimal transport of tryptophan across the intestine and also into the brain, a relatively high tryptophan/LNAA ratio is desirable. Compared to current infant formula, the present formula possesses a better tryptophan/LNAA ratio, ie, closer to that of human milk.

Cystine is a component of glutathione, a tripeptide with important metabolic functions. Gluthathione is essential as an antioxidant and also in ensuring optimal immune function. The present formula contains elevated cystine levels compared to current whey- and casein-dominant formulas.

The amino acid composition of the present infant formula enables a reduction in the total protein level to a level closer to human milk while complying with EU amino acid requirements.

EXAMPLE 4

The improved formula and the control formula of Example 2 were evaluated in a prospective, multi-center, randomized, controlled, color-coded, parallel-group, outpatient study in healthy, term infants. Infants were randomized to receive one of the two formulas and were followed for 12 weeks.

Infants were healthy full-term infants with weights and lengths appropriate for gestational age. Weight-for-length ratios were between the $10^{th}$ and $90^{th}$ percentiles for age according to growth charts provided by the National Center for Health Statistics (NCHS).

At enrollment, infants were no more than 14 days of age. Weight and length were still between the $10^{th}$ and $90^{th}$ percentiles for age according to the NCHS growth charts. Infants were exclusively fed study infant formula.

Feeding of study formula began the day of the baseline visit. Of the 193 infants who entered the study, 98 infants received the infant formula of the present invention and 95 infants received the control formula. An infant could be withdrawn from the study for formula intolerance, for receiving non-study feedings for more than 5 consecutive days or more than 7 cumulative days, for receiving human milk, baby food, or other solid foods, or for noncompliance with the study protocol. The physician or the parent could withdraw an infant voluntarily at any time for any reason.

Of the 98 infants assigned to the experimental formula, 72 (73.5%) completed the study. Of the 95 infants assigned to the control formula, only 62 (65.3%) completed the study. Eight infants (8.2%) in the experimental group and four infants (4.2%) in the control group discontinued from the study because of protocol violations. Five infants in the experimental group and four infants in the control group discontinued because they failed to return. Of the remaining infants, 72, or 85%, of the experimental group and 62, or 71%, of the control formula group completed the study. More of the infants in the control group discontinued the study due to adverse events (20/95 or 21%) than did those infants in the improved formula group (15/98 or 15.3%).

TABLE 9

Infant Enrolment and Discontinuation

| | Experimental Formula | Control Formula | Total |
|---|---|---|---|
| Status | (N = 98) | (N = 95) | (N = 193) |
| Reason for discontinuation | N | N | N |
| Entered | 98 | 95 | 193 |
| Failed to return | 5 | 4 | 9 |
| Protocol violation | 8 | 4 | 12 |
| Relevant number | 85 (100%) | 87 (100%) | 172 (100%) |
| Completed | 72 (85%) | 62 (71%) | 134 (%) |
| Discontinued for* | | | |
| Adverse event | 15 | 20 | 35 |
| Physician/family request | 19 | 23 | 42 |
| Other reasons | 2 | 3 | 5 |

*Multiple reasons for discontinuation were allowed in this study.

The primary efficacy measurements were infant weight (g), length (cm), and head circumference (cm), which were recorded at baseline and at Weeks 4, 8, and 12. Assessments were to be done up to three days before enrollment, and within ±3 days of the other time points.

Baseline values for age, length, and head circumference were similar between the two study groups. At baseline, mean ages were 10.1 days and 10.5 days, mean lengths were 51.5 cm and 51.3 cm, and mean head circumferences were 35.4 cm and 35.5 cm for the experimental and control groups, respectively. There was a statistically significant difference in weight between the two study groups at baseline (p=0.04). Infants in the experimental group were slightly heavier, on average, than infants in the control group (3536.4 g vs. 3458.5 g).

Both formulas were effective at promoting growth. Infants fed either study formula grew to a similar extent during the study. After baseline, there were no statistically significant differences between the formula groups on any of the growth measures (weight, length, or head circumference). The anthropometric data showed significant growth on all measures over a 12-week period, with the average infant gaining approximately 2700 g of body weight, 10 cm in body length, and 5 cm in head circumference. There was no statistically significant difference between the groups fed the experimental and control formulas at Weeks 4, 8, or 12. Z-scores for mean weight gain from baseline to week 12 were higher in the improved formula group (+0.49) as compared to the control group (+0.183). The improved formula group also had fewer non-study feedings than the control group (35.7% versus 42%, respectively).

Adverse events and acceptability and tolerance of study formula were recorded at visits at Weeks 4, 8, and 12 and by telephone contacts at Weeks 2, 6, and 10. Assessments were done within 3 days before or after the time point. Tolerance data were collected by interview. An adverse event was defined as any untoward medical occurrence in an infant to whom a test article was administered in a clinical investigation; the event did not necessarily have a causal relationship to the test formula. An adverse event could be any unfavorable and unintended sign (including an abnormal laboratory finding), symptom, or disease temporally associated with the use of a study formula, whether or not it was considered related to the study formula.

Less than half of the infants in the experimental and control groups had adverse events considered to be formula-related (42 [42.9%] and 44 [46.3%], respectively). The most common formula-related adverse events for all infants were flatulence (34 infants), constipation (30 infants), and vomiting (26 infants). In both groups, 17 infants had formula-related flatulence. Formula-related constipation occurred more often in infants in the experimental group (19) than in infants in the control group (11). Formula-related vomiting occurred in 12 infants in the experimental formula group and in 14 infants in the control formula group. Twice as many infants in the control group as in the experimental group experienced formula-related diarrhea (8 vs. 4).

No infants in the present formula group had formula-related adverse events of the respiratory system, and three infants (3.2%) in the control group had such events. Overall, the adverse event profiles of the two study formulas were similar.

Protein status (serum albumin, blood urea nitrogen (BUN), and creatinine) were secondary safety endpoints measured at baseline and at Week 12. The present formula group was fed a lower protein quantity (1.4 grams Protein/100 mL) than the control group (1.5 grams Protein/100 mL). Both study groups had a similar adequate protein status at the 12-week end of the study as defined by serum albumin levels (4.1 mg/dl in both groups). Comparable growth and serum albumin status indicate adequate protein nutrition from the alpha-lactalbumin rich formula despite lower total protein content. At study completion, the experimental group had lower BUN levels than the control group (8.2 mg/dl vs. 9.3 mg/dl), indicating a high quality protein source and reduced need for excess protein removal.

Acceptability and tolerance data are summarized in Table 22. Both the experimental and control formulas were acceptable and well tolerated by most of the infants at all study time points. At all time points after Week 2, acceptability and tolerance were slightly greater in infants who received the present formula. The percentage of infants whose overall acceptability and tolerance of study formula was satisfactory ranged from 90% at Week 2 to 100% at Weeks 10 and 12 for infants who received the improved formula and ranged from 85.9% at Week 4 to 98.4% at Week 10 for infants who received the control formula. Unacceptable ratings ranged from 0–10% in the improved formula group (average 4.1%) and from 1.6–14.1% in the control group (average 7.0%). The data indicates that the improved formula provides enhanced protein nutrition and formula acceptability.

TABLE 10

Summary of Acceptability and Tolerance of the Study Formula

| Time Point | Experimental Formula (N = 98) | | Control Formula (N = 95) | |
|---|---|---|---|---|
| Overall Acceptability and Tolerance | n | (%)* | n | (%)* |
| Week 2 | | | | |
| Satisfactory | 81 | (90.0) | 82 | (95.3) |
| Unsatisfactory | 9 | (10.0) | 4 | (4.7) |
| Week 4 | | | | |
| Satisfactory | 81 | (91.0) | 73 | (85.9) |
| Unsatisfactory | 8 | (9.0) | 12 | (14.1) |
| Week 6 | | | | |
| Satisfactory | 77 | (97.5) | 61 | (92.4) |
| Unsatisfactory | 2 | (2.5) | 5 | (7.6) |
| Week 8 | | | | |
| Satisfactory | 75 | (97.4) | 64 | (88.9) |
| Unsatisfactory | 2 | (2.6) | 8 | (11.1) |
| Week 10 | | | | |
| Satisfactory | 69 | (100.0) | 61 | (98.4) |
| Unsatisfactory | 0 | (0.0) | 1 | (1.6) |
| Week 12 | | | | |
| Satisfactory | 72 | (100.0) | 61 | (96.8) |
| Unsatisfactory | 0 | (0.0) | 2 | (3.2) |

*Percentages at each visit are calculated from the number of infants who contributed data at that time point.

The present invention may be embodied on other specific forms without departing for the spirit and essential attributes thereof and accordingly, reference should be made to the appended claims, rather than to the foregoing specification, as indicating the scope of the invention.

What is claimed is:

1. An infant formula composition comprising an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein.

2. The infant formula composition of claim 1, wherein said bovine whey material has an alpha-lactalbumin content of 28% to 36% and a beta-lactoglobulin content of 10% to 29% of total protein.

3. The infant formula composition of claim 1, wherein said bovine whey material is further characterized by:

(a) a non-protein nitrogen content of 15% or less of total nitrogen;

(b) a total protein content of 12.5% to 95%;

(c) a fat content of 15% or less; and (d) an ash content of 4.5% or less.

4. The infant formula composition of claim 1, wherein said bovine whey material has a total protein content of 35% to 80%.

5. The infant formula composition of claim 4, wherein said bovine whey material has a total protein content of 73% to 77%.

6. The infant formula composition of claim 1, said bovine whey material being further characterized by amino acid contents of no less than the following, in grams per 100 grams of total protein:

(a) Arginine, 3.1;

(b) Cystine, 1.4;

(c) Histidine, 1.6;

(d) Isoleucine, 1.0;

(e) Leucine, 5.3;

(f) Lysine, 3.9;

(g) Methionine, 0.3;

(h) Phenylalanine, 1.2

(i) Threonine, 3.2;

(j) Tryptophan, 1.5;

(k) Tyrosine, 0.9; and (l) Valine, 1.0.

7. The infant formula composition of claim 1, wherein the dominant whey protein is alpha-lactalbumin.

8. The infant formula composition of claim 1, wherein the amount of alpha-lactalbumin is no less than 2.2 grams per 670 available kilocalories (0.33 g/100 kcal).

9. A method of feeding an infant, comprising feeding a nutritionally sufficient amount of the infant formula of claim 1 to an infant less than one year of age.

* * * * *